US012270529B2

(12) United States Patent
Faste

(10) Patent No.: US 12,270,529 B2
(45) Date of Patent: Apr. 8, 2025

(54) MARINE LANTERN WITH CONTINUOUS LOOP SUSPENSION

(71) Applicant: University of Oregon, Eugene, OR (US)

(72) Inventor: Trygve A. Faste, Eugene, OR (US)

(73) Assignee: University of Oregon, Eugene, OR (US)

( * ) Notice: Subject to any disclaimer, the term of this patent is extended or adjusted under 35 U.S.C. 154(b) by 0 days.

(21) Appl. No.: 18/508,734

(22) Filed: Nov. 14, 2023

(65) Prior Publication Data

US 2024/0159381 A1 May 16, 2024

Related U.S. Application Data

(60) Provisional application No. 63/425,904, filed on Nov. 16, 2022.

(51) Int. Cl.

| | |
|---|---|
| ***F21V 17/00*** | (2006.01) |
| ***D07B 1/02*** | (2006.01) |
| ***F21L 4/08*** | (2006.01) |
| ***F21V 17/08*** | (2006.01) |
| ***F21V 21/06*** | (2006.01) |
| ***F21V 23/00*** | (2015.01) |
| *F21Y 115/10* | (2016.01) |

(52) U.S. Cl.

CPC .............. *F21V 17/08* (2013.01); *D07B 1/025* (2013.01); *F21L 4/08* (2013.01); *F21V 21/06* (2013.01); *F21V 23/003* (2013.01); *D07B 2205/2014* (2013.01); *F21Y 2115/10* (2016.08)

(58) Field of Classification Search

CPC ........... F21V 23/003; F21L 4/08; D07B 1/025

See application file for complete search history.

(56) References Cited

U.S. PATENT DOCUMENTS

| | | | | |
|---|---|---|---|---|
| 3,560,733 A * | 2/1971 | Bergman | F21V 17/06 | 33/348.2 |
| 7,288,298 B2 * | 10/2007 | Huang | B44C 5/00 | 428/9 |
| 2006/0130727 A1 * | 6/2006 | Eischeid | E01F 9/617 | 114/219 |
| 2013/0139741 A1 * | 6/2013 | Fields | D07B 1/145 | 114/230.21 |
| 2014/0321106 A1 * | 10/2014 | Workman | F21V 23/003 | 362/249.02 |

(Continued)

FOREIGN PATENT DOCUMENTS

WO WO-2015120332 A1 * 8/2015 ................ F21L 4/02

OTHER PUBLICATIONS

"Teaching by Design with Trygve Faste." Oregon Quarterly. Jan. 19, 2022. Retrieved Nov. 14, 2023 from URL https://around.uoregon.edu/content/teaching-design-trygve-faste.

*Primary Examiner* — Gerald J Sufleta, II

(74) *Attorney, Agent, or Firm* — LUMEN PATENT FIRM

(57) ABSTRACT

A lantern that can be suspended under high tension includes a housing with a central longitudinal channel passing through the entire length of the lantern, and a continuous loop cable passing through the central channel with top and bottom portions of the loop positioned outside the channel. The lantern also includes a plurality of LED lights, an electric battery, an electronic controller circuit, and a button allowing a user to change lighting modes of the lantern.

13 Claims, 9 Drawing Sheets

(56) References Cited

U.S. PATENT DOCUMENTS

| | | | | |
|---|---|---|---|---|
| 2015/0176821 | A1* | 6/2015 | Vogt | F21V 21/30 362/233 |
| 2015/0184825 | A1* | 7/2015 | Chen | F21V 21/08 362/186 |
| 2015/0192243 | A1* | 7/2015 | Sharrah | F21L 4/00 362/190 |
| 2019/0063696 | A1* | 2/2019 | Grandadam | F21V 15/01 |
| 2021/0318168 | A1* | 10/2021 | Ramer | G01J 1/38 |
| 2022/0397250 | A1* | 12/2022 | Sreshta | H02J 7/35 |

* cited by examiner

MARINE LANTERN WITH CONTINUOUS LOOP SUSPENSION

CROSS-REFERENCE TO RELATED APPLICATIONS

This application claims priority from U.S. Provisional Patent Application 63/425,904 filed Nov. 16, 2022, which is incorporated herein by reference.

FIELD OF THE INVENTION

The present invention relates generally to lamps and lanterns. More specifically, it relates to lanterns that can be suspended under high tension.

BACKGROUND OF THE INVENTION

Traditionally, lanterns are suspended using an inverted U-shaped mechanical handle attached near the top of the exterior housing of the lantern. These handles are designed to support the weight of the lantern when it is freely hanging. In marine applications, however, such a freely hanging lantern can swing uncontrollably in high winds. Securing the lantern under tension using a second handle or hook attached near the bottom of the exterior housing of the lantern can address this problem, but can result in large mechanical strain on the handles and exterior housing, especially at the locations where the handles are attached to the exterior housing. Thus, there remains a need for a lantern that can be suspended securely under high tension without placing high mechanical strain on the lantern's exterior housing and/or handles.

SUMMARY OF THE INVENTION

The present invention provides a lantern having a continuous loop cable running through the center of the housing. This design offers a variety of advantages to the lantern and allows the lantern to be suspended under tension, hung conventionally from the top, or simply placed on a flat surface. Boats and situations vary, and the adjustable continuous loop cable allows the lantern to be suspended from either direction depending on need. This affords many ways to secure the lantern from both above and below. As a result, the lantern can be used as a stern light, an anchor light at the top of the mast, or as navigation lights in various orientations.

While LED lanterns are commonplace, combining the functionality of a camping lantern, navigation lights, and an anchor light into a compact housing with a design sturdy enough to be suspended from rigging under high tension from both directions without damage, is an advantageous combination of features.

The lantern combines essential functions of a boating lantern into a simple, aesthetically appropriate, and space efficient form. When provided with color changing LEDs, this lantern can serve as a versatile light source for any boater in a variety of functions. For the small boater, the lantern serves as a useful camping light, a legally required nighttime running lights of red and green for traveling after dark, and a white anchor light for hoisting up the mast when sleeping aboard. For the larger boat, the lantern is useful in the cabin and can serve as an emergency backup to provide peace of mind should the boat's primary navigation lights fail.

In one embodiment, the batteries can be easily recharged through solar panels or any boat's electrical system through a waterproof USB port. The minimal design is intended to look at home on both classic and modern boats.

In one aspect, the present invention provides a marine lantern comprising: a housing having an exterior casing and a central longitudinal channel within the exterior casing and passing through an entire length of the exterior casing; a continuous loop cable having a middle section positioned through the central channel and having top and bottom portions positioned outside a top and a bottom of the housing; a plurality of LED lights; an electric battery; and an electronic controller circuit connected to the lights and to the battery.

In one embodiment, the central channel is formed by a tube having two members comprising half-cylindrical portions. The central channel may have terminating end pieces, wherein each of the terminating end pieces has two openings, and wherein the continuous loop cable is threaded through the two openings.

In one embodiment, the exterior casing has a bottom with a recessed portion deeper than a thickness of the continuous loop cable. Alternatively, the exterior casing may have a bottom with protruding stubs. The housing is preferably composed of anodized aluminum (or other non-corrosive metal) and polycarbonate The continuous loop cable is preferably a rope composed of metallic wire or nonmetallic fiber. For example, the continuous loop cable may be a synthetic fiber loop comprising ultra-high molecular weight polyethylene. Alternatively, the continuous loop cable may be a metal wire swaged together.

In one embodiment, the plurality of LEDs comprise LEDs that emit light having multiple distinct colors. For example, in marine applications, the LEDs may emit red, green, and white light.

In one embodiment, the lantern includes a rotating dial or button connected to the electronic controller circuit. This dial or button may be used to control the brightness of the light and/or select different lighting modes.

The lantern may also include a waterproof USB port connected to the electric battery. The USB port may be used to recharge the battery.

DETAILED DESCRIPTION OF THE INVENTION

Figure 1:
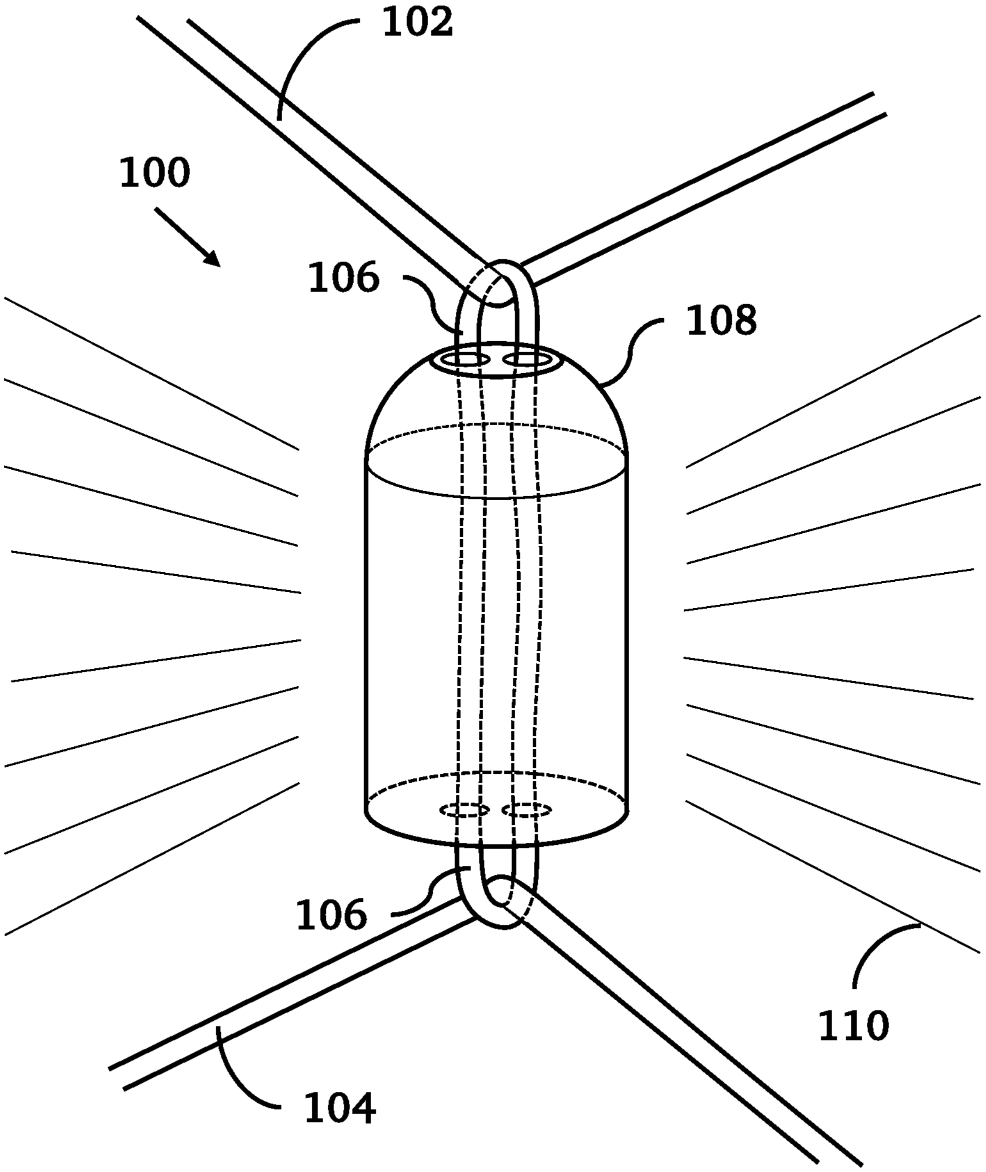
FIG. 1 is a perspective view of a lantern suspended from two ropes under high tension, according to an embodiment of the invention.

FIG. 1 is a perspective view of a lantern 100 that emits light 110 according to an embodiment of the invention. In use, the lantern 100 is able to be suspended under high tension from both top and bottom using an upper rope 102 and lower rope 104. A continuous loop cable 106 threaded through the center of the housing 108 of the lantern is used for hanging or securing the lantern under high tension from top and bottom ends of the rope. All the tension is in the continuous loop cable 106. None of the tension between ropes 102 and 104 puts a mechanical strain on the lantern housing 108. The continuous loop cable running through the center of the lantern allows it to be hung from either top, bottom, or both. This affords many ways to secure the lantern from both above and below to avoid swinging. As a result, the lantern can be used as an anchor light at the top of the mast, or as navigation lights in various orientations.

Figure 2:
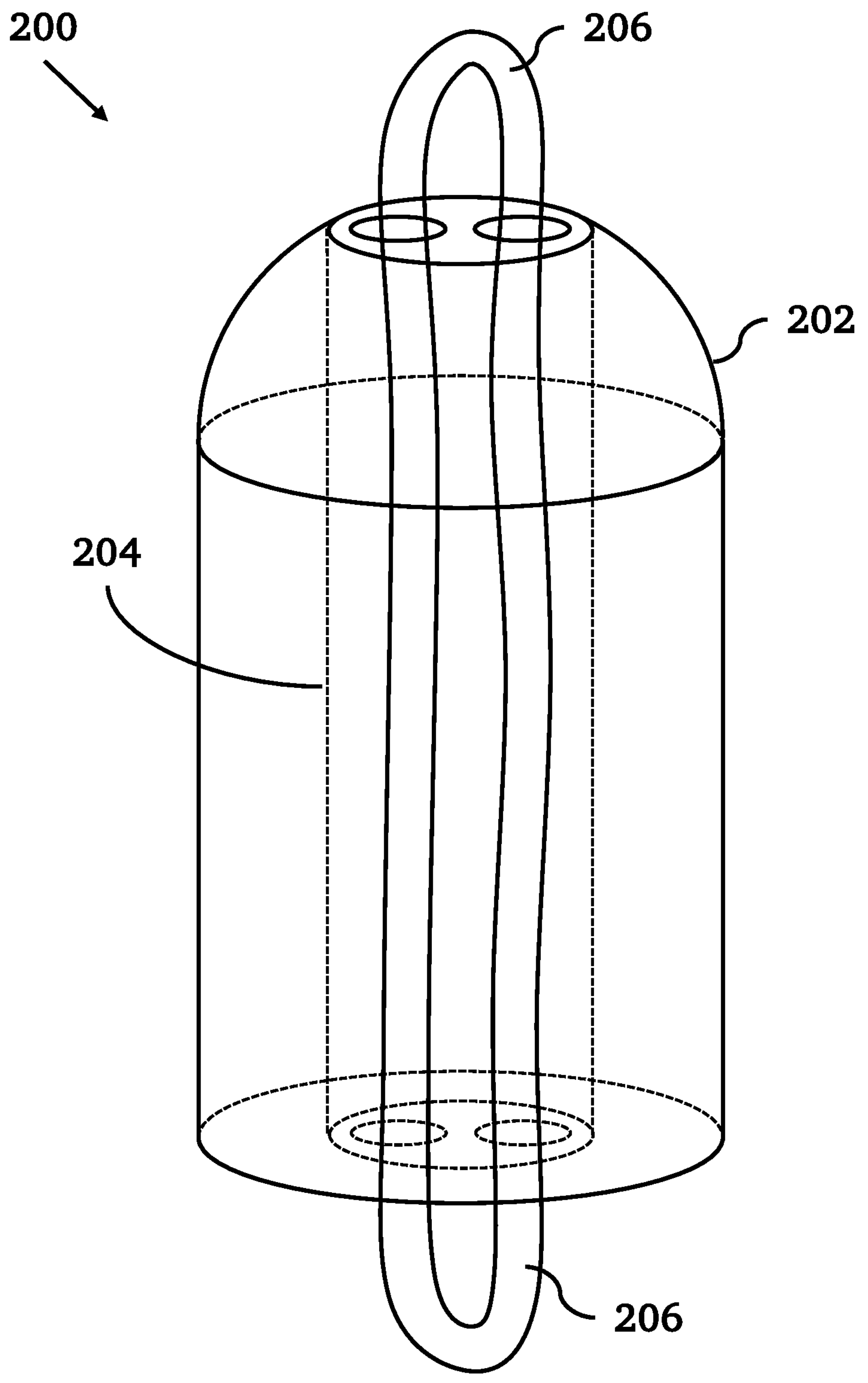
FIG. 2 is a perspective view of a lantern with a continuous loop cable passing through a central longitudinal channel, according to an embodiment of the invention.

As shown in more detail in FIG. 2, the marine lantern 200 has a housing having an exterior casing 202 and a central longitudinal channel 204 running through the interior of exterior casing 202. The channel 204 passes through an entire length of the exterior casing 202. The lantern 200 also has a continuous loop cable 206 whose middle section is positioned through the entire length of the central channel 204. The total length of the cable forming the loop is more than twice the height of the lantern housing. Top and bottom portions of the loop 206 may be positioned outside a top and a bottom of the housing, as shown.

The continuous loop cable 206 is threaded through the central channel 204 of the lantern and can move or slide within the channel. As a result, the lantern's hanging cable 206 can be held under tension from both ends with no worry of damaging the lantern housing 202. This allows sailors to hoist the lantern up the mast and secure a downhaul to allow retrieval of the lantern and prevent the lantern from swinging about when aloft. A benefit to the continuous loop cable design is that there is no danger of the lantern's handle breaking due to mechanical failure of the housing—a serious issue that could result in the boat's halyard being stuck at the top of the mast. The versatility of suspension options gives mariners the ability to be creative in how they choose to hang the lantern depending on their boat and the situation. The sliding loop also allows the lantern to be hung from the top, the bottom, and set on a table without the hanging cable getting in the way.

Figure 3:
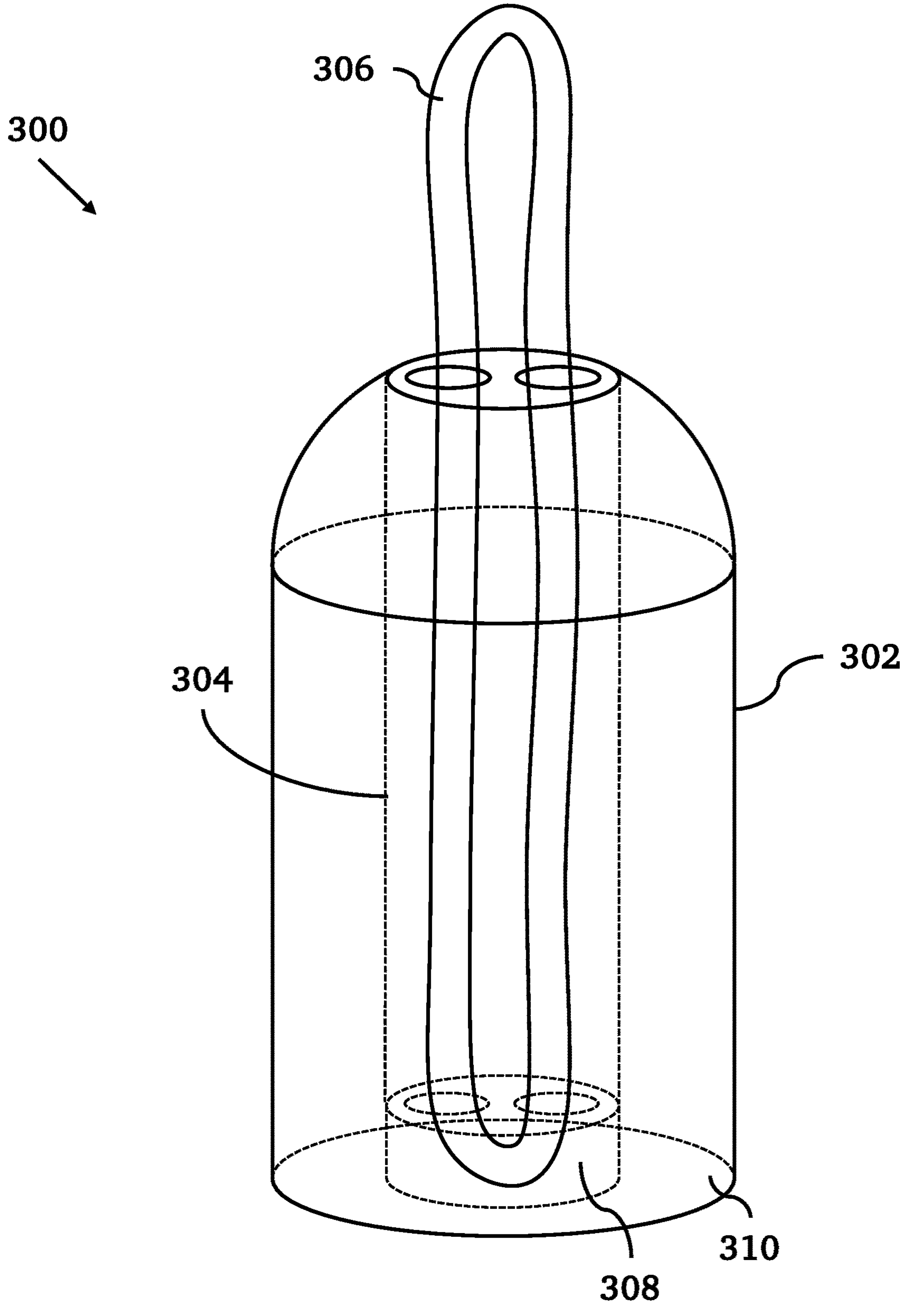
FIG. 3 is a perspective view of a lantern with a recessed portion at the bottom of the housing, according to an embodiment of the invention.

In some embodiments, the housing has features that facilitate resting the lantern on a flat surface without interference from the cable at the bottom. For example, FIG. 3 shows an embodiment of a lantern 300 having a housing 302 with a central channel 304 through which a continuous loop cable 306 is threaded. The channel 304 in this embodiment has a recessed portion 308 at the bottom. The depth of the recess 308 from the bottom 310 of the housing is deeper than a thickness of the continuous loop cable 306. This allows the cable to avoid interference with the lantern bottom 310 resting stably on a flat surface. The recessed portion of the bottom is preferably not too deep or narrow, so that fingers may easily grasp the cable. Thus, the recessed area 308 at the bottom of the lantern is designed so that the rope is both accessible for pulling, and also out of the way when the lantern sits on its base.

Figure 4:
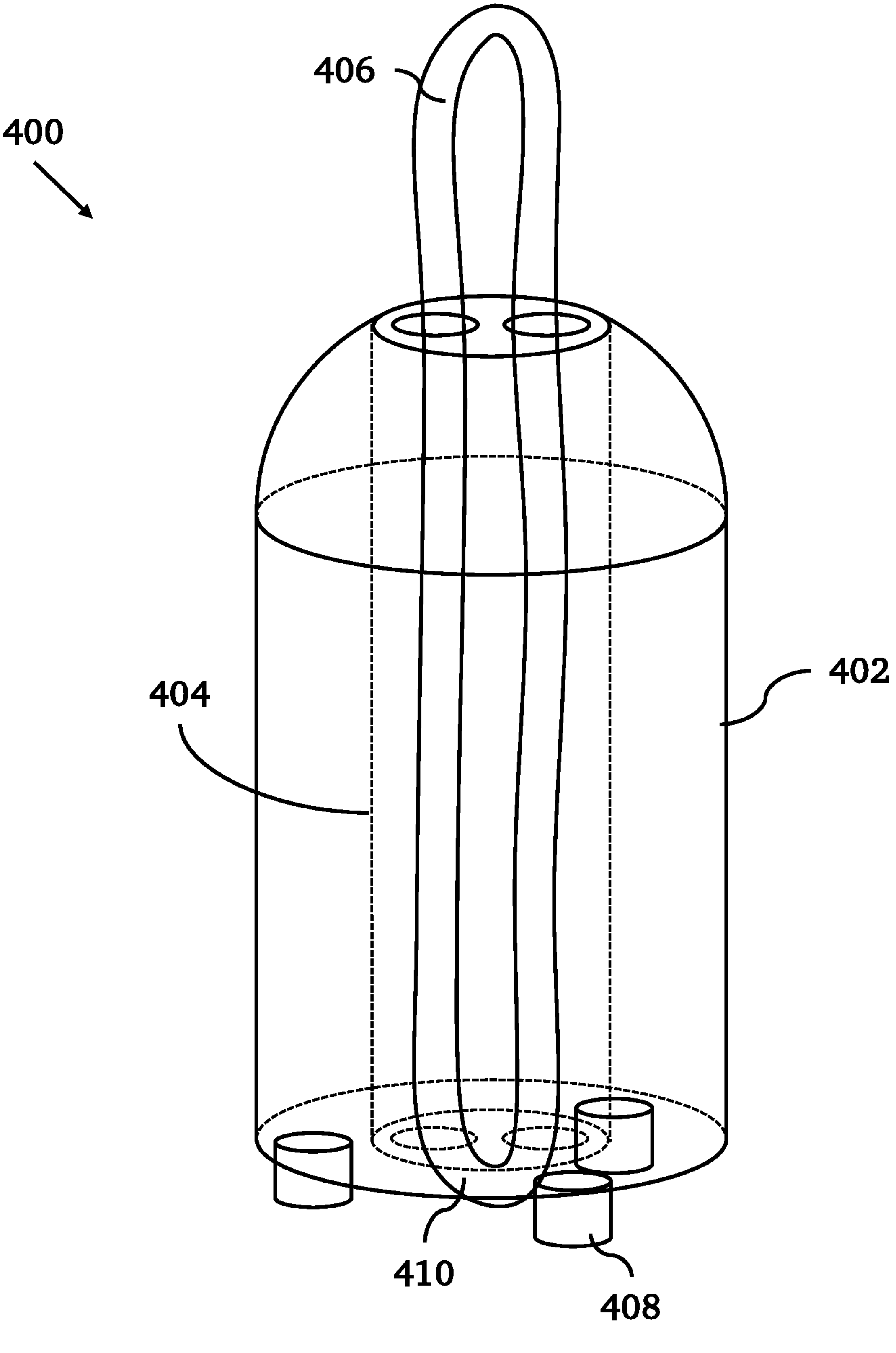
FIG. 4 is a perspective view of a lantern with protruding stubs or feet at the bottom of the housing, according to an embodiment of the invention.

Alternatively, FIG. 4 shows an embodiment of a lantern 400 having a housing 402 with a central channel 404 through which a continuous loop cable 406 is threaded. The bottom 410 of the housing may be provided with protruding stubs or small feet 408 to raise the bottom high enough that the cable 406 does not interfere with resting the lantern on a flat surface. The feet 408 are preferably at least as tall as the thickness of the cable 406.

Figure 5:
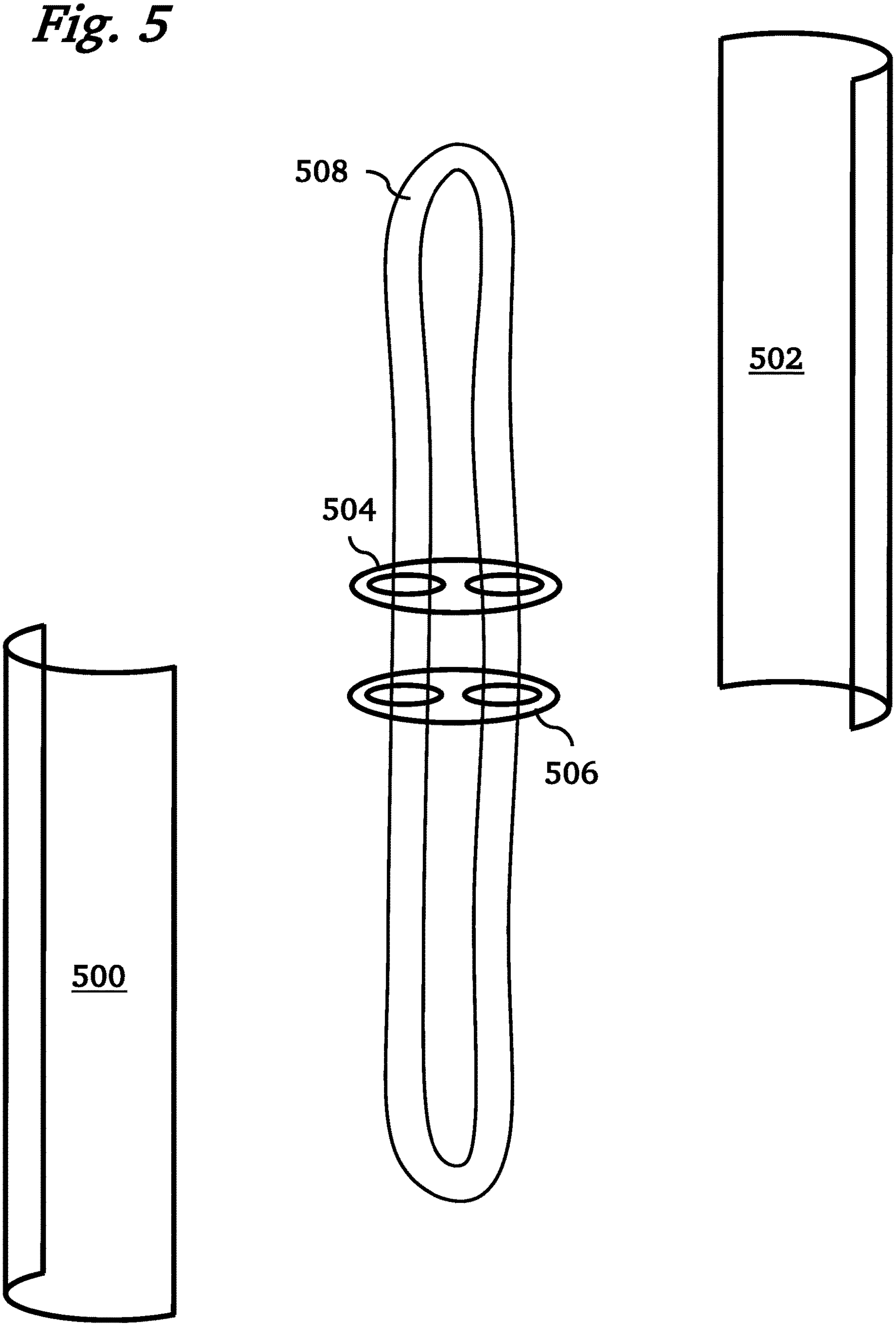
FIG. 5 is a perspective view of two halves of a central channel and matching end pieces with two openings through which the continuous loop cable is threaded, according to an embodiment of the invention.
Figure 6:
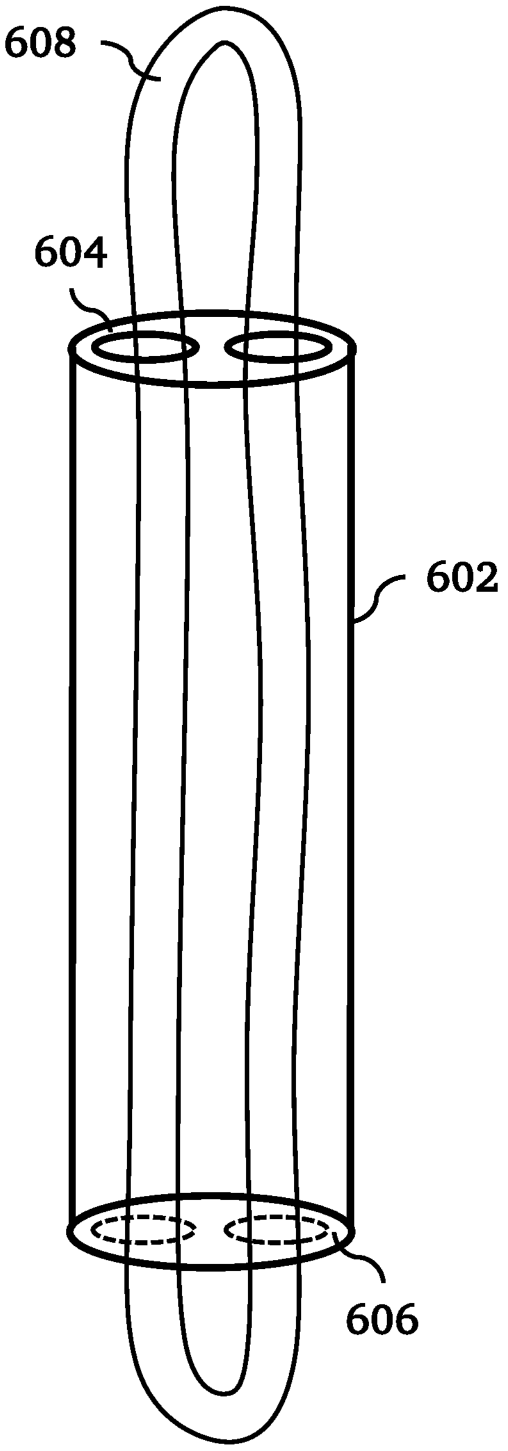
FIG. 6 is a perspective view of the assembled central channel of FIG. 5, according to an embodiment of the invention.
Figure 7:
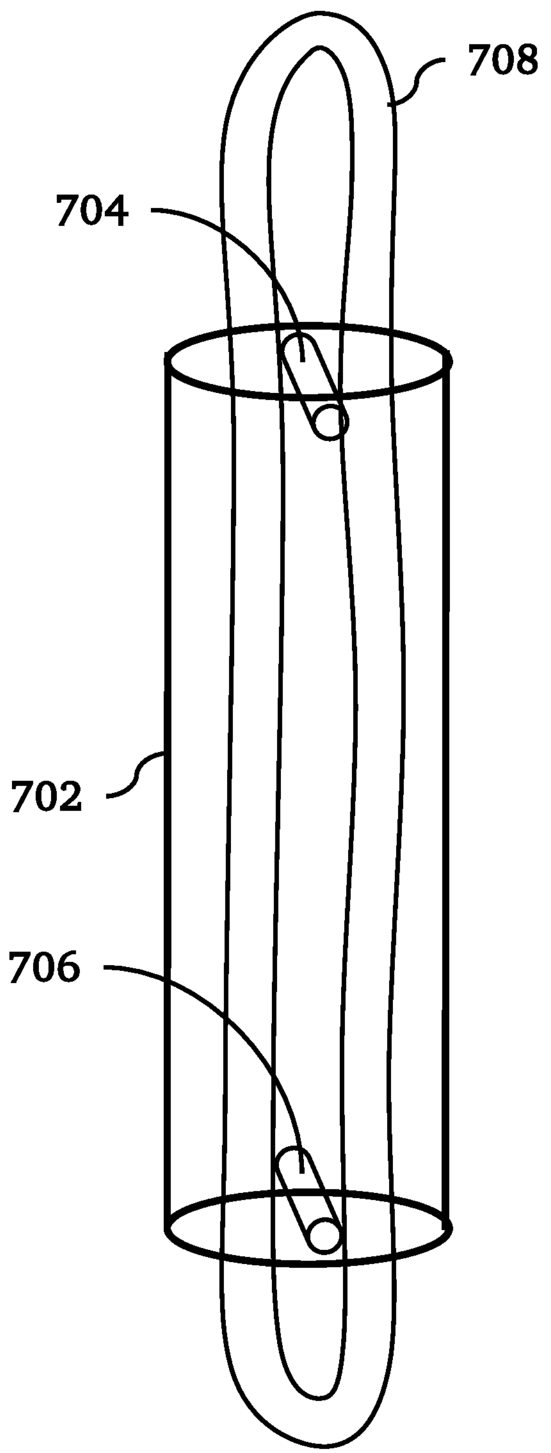
FIG. 7 is a perspective view of a single-piece central channel with bars or pegs positioned across the ends of the channel, according to an embodiment of the invention.
Figure 8:
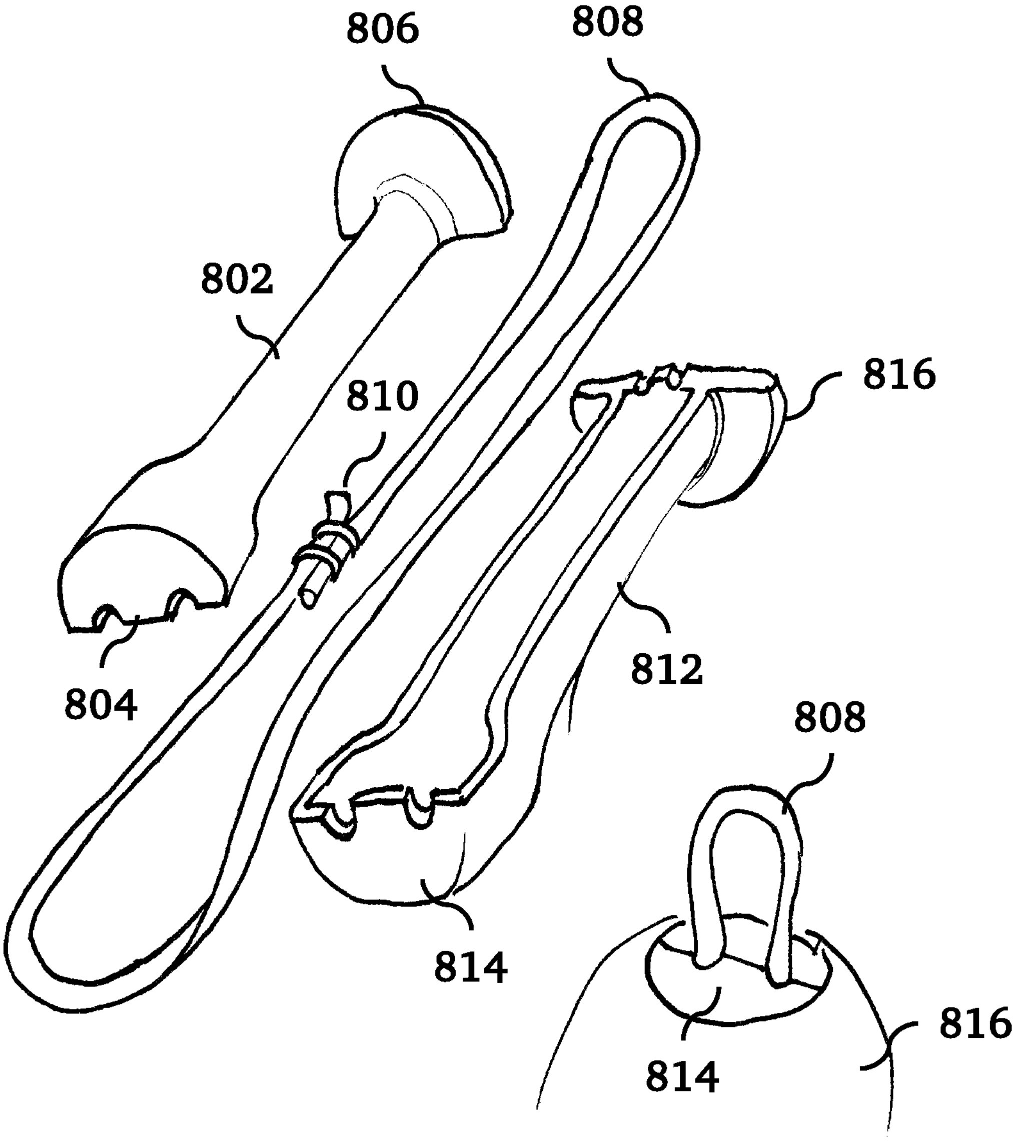
FIG. 8 is a perspective view of a central channel composed of two half cylinders with integrated with half-circular end pieces, according to an embodiment of the invention.

The length of the continuous loop cable is sufficiently large that the loop may extend out from both the top and bottom of the central channel of the lantern. The amount of excess cable outside the channel, however, may not be sufficient to allow easily connecting the cable to form a loop during assembly, e.g., by splicing. To facilitate assembly, the central channel may be formed by a tube having two members 500, 502 comprising half-cylindrical portions, as shown in FIG. 5. The central channel may have terminating end pieces 504, 506, each having two openings through which the cable 508 is threaded prior to being attached to itself to form a continuous loop. The use of two holes at each end helps to prevent the lantern from revolving when suspended from above and below. During assembly, the cable is first threaded through the holes in the top and bottom end pieces 504, 506. It is noted that the end pieces can be positioned close to each other at this point in the assembly. After the cable is threaded through the end pieces, its ends are connected together (e.g., by splicing) to form a continuous closed loop 508. Then the end pieces can be spaced apart and the two half tubes can be joined together to enclose the cable loop, as shown in FIG. 6, where the loop 608 is shown passing through the two end pieces 604, 606 and enclosed by central channel tube 602. During assembly of the loop, the central channel of the lantern is removable so end pieces of the loop are freely moving/sliding together through loop to give slack and facilitate splicing the ends of the rope together to form a closed loop without the rope being too long. Alternatively, as shown in FIG. 7, instead of plates, the end pieces may be bars or pegs 704, 706 positioned across the ends of the tube 702 to prevent the cable 708 from twisting inside the tube. These bars may be positioned after the closed loop is formed and inserted through the tube. During assembly, the pieces may be glued, screwed, attached together with snap fittings, or other methods of connections. The end pieces may take various forms other than plates or pegs. For example, they could also be cylindrical threaded plugs. The end pieces may also be integrated with the central channel and split in halves, as shown in FIG. 8. The central channel is formed by joining two half cylinders 802, 812, each of which is integrated with half circular end pieces 804, 806 and 814, 816, respectively. After the continuous loop cable 808 is formed by mechanical attachment, knot, or splice of its ends together, its central portion is placed inside the channel and the two cylindrical halves are joined. This loop has the entire core assembled around it. In such embodiments, each of the end pieces with two holes has a seam between the two halves that is visible on the top and bottom of the lantern when it is assembled. The central channel containing the loop 808 is then inserted in the housing 816 of the lantern.

Continuous loop cables may be made using various known techniques. These include, for example, splicing (braided rope), locked Brummel, or straight splice with lock stitching; three strand rope grommet connection method; metal wire 'rope' can be swaged together; or mechanical fasteners can be used to join ends of a rope loop together. There are lots of varieties of techniques, and they all have different advantages. For example, ends of three strand nylon rope or bungee cord may be attached with 'hog rings'. Also, synthetic rope may be heat fused together. The design will also work with a loop created by a tied knot.

A continuous loop cable may be made of any strong metallic wire or nonmetallic fiber that can be spliced into a continuous loop. The fiber may be natural or synthetic, and the cable may take the form of a rope, strap, or wire. Length and method of splicing techniques will vary depending on the specific material, provided the splice portion can be hidden within the height of the lantern. The continuous loop cable may be made of strong synthetic fiber loop line. In embodiments where high strength is needed, loops made of synthetic fiber comprising ultra high molecular weight polyethylene (e.g., Dyneema™) are preferred. Their strength varies depending on the rope diameter. For example, a 4 mm Dyneema™ rope made into a loop soft shackle can withstand up to 2.7 metric tonnes (or 5952 lbs) of force. A 4 mm Dyneema™ rope (not looped) can hold 4,000 lbs, so the loop strengthens the rope quite a bit. A 3 mm Dyneema™ rope (not looped) can hold 2,500 lbs of weight. Preferred embodiments of the present invention for nautical applications use a 3 mm diameter rope, but other diameters, such as 4 mm diameter rope, are also possible for these applications.

Figure 9:
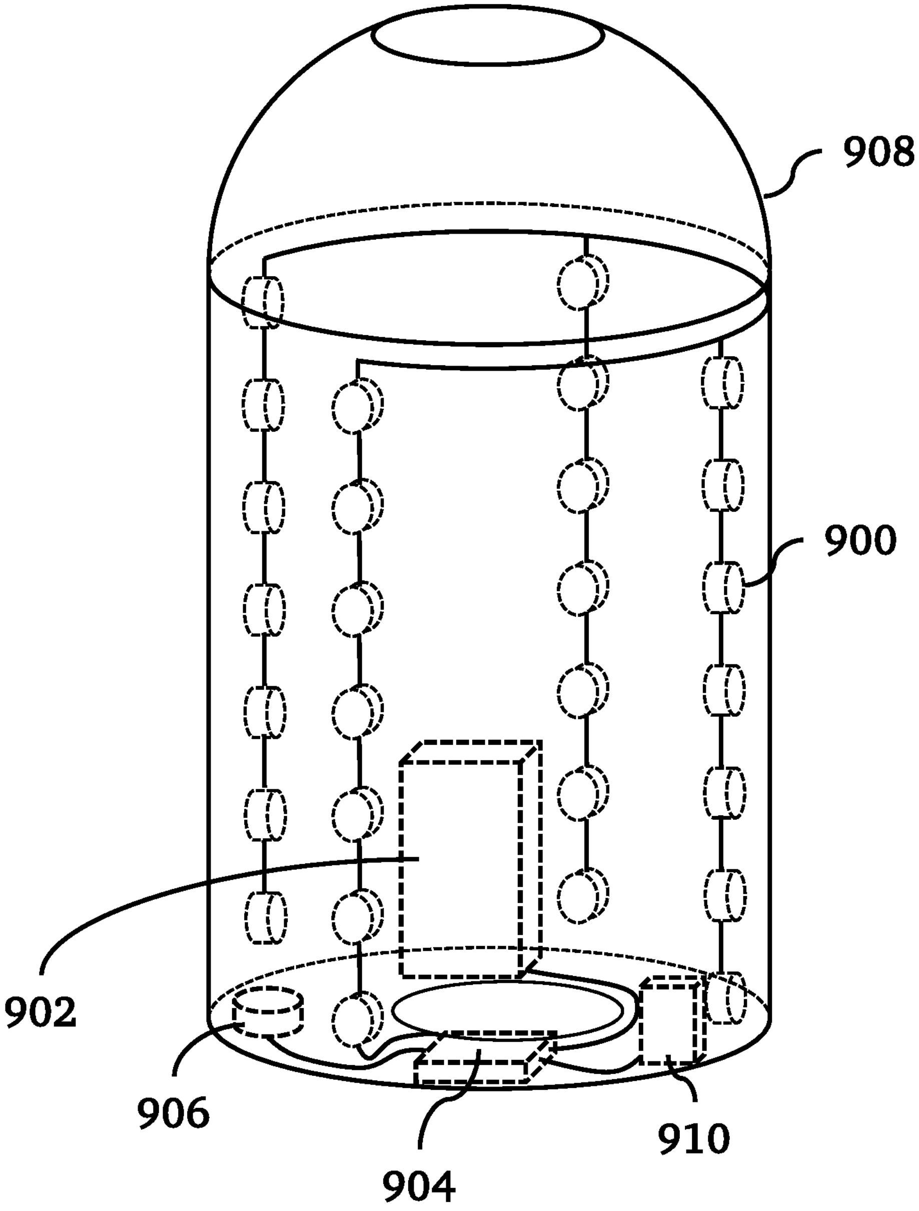
FIG. 9 is a perspective view of interior components of a lantern, including LED lights, battery, controller circuit, and a light control button, according to an embodiment of the invention.

The embodiments of the lantern illustrated and described above also include LED lights 900, an electric battery 902, an electronic controller circuit 904, as shown in FIG. 9. The lantern preferably includes an electrical port 910 such as a waterproof USB port to allow recharging of the electric battery. The LED lights 900 preferably emit light having multiple distinct colors. For example, in marine applications, the LEDs may emit red, green, and white light. Different lighting modes are controlled by the electronic controller circuit 904. These modes may include different spatial patterns, e.g., all white lights or red lights on one side of the lantern and green lights on the other side of the lantern. The modes may also include modes with different lighting intensity levels, and flashing or continuous lighting modes. A user may turn the lantern on and off, and select different lighting modes with one or more dials or buttons 906 placed on the housing 908.

This versatility of how the lantern can be suspended gives mariners the ability to be creative in how they choose to use it depending on their boat and the situation. The light can switch which side is red and which side is green depending on which end of the lantern is pointing up when suspended (so that green will be on the starboard side and red will be on the port side). A rotating dial or button allows for adjustment of the brightness of the white light and selection of navigation light modes. A sturdy removable protection cage can be attached to the lantern to protect the housing from being damaged.

In one implementation, the lantern is 567 g (20 ounces) with a width of 102 mm (4 in), and height of 140 mm (5.5 in). The housing is preferably composed of anodized aluminum and polycarbonate.

Instead of passing through a central channel, the loop of rope may alternatively pass around the outside of the lantern, e.g., secured using rings or channels on opposite sides of the lantern.

The continuous loop suspension designs described herein may also be used for hanging objects other than a lantern. For example, instead of a lantern the suspension design may be used to hang a radar reflector, an anchor signal, a flag, indoor lighting fixtures in buildings, bird feeders, or hanging pots.

The invention claimed is:

1. A marine lantern comprising:

a housing having an exterior casing and a central longitudinal channel within the exterior casing and passing through an entire length of the exterior casing;

a closed continuous loop cable having a middle section positioned through the central longitudinal channel and having top and bottom portions positioned outside a top and a bottom of the housing;

a plurality of LED lights;

an electric battery; and an electronic controller circuit connected to the lights and to the battery.

2. The marine lantern of claim 1 wherein the central longitudinal channel is formed by a tube having two members comprising half-cylindrical portions.

3. The marine lantern of claim 1 wherein the central longitudinal channel has terminating end pieces, wherein each of the terminating end pieces has two openings, and wherein the closed continuous loop cable is threaded through the two openings.

4. The marine lantern of claim 1 wherein the exterior casing has a bottom with a recessed portion deeper than a thickness of the closed continuous loop cable.

5. The marine lantern of claim 1 wherein the exterior casing has a bottom with protruding stubs.

6. The marine lantern of claim 1 wherein the housing is composed of anodized aluminum and polycarbonate.

7. The marine lantern of claim 1 wherein the closed continuous loop cable is a rope composed of metallic wire or nonmetallic fiber.

8. The marine lantern of claim 1 wherein the closed continuous loop cable is a synthetic fiber loop comprising ultra high molecular weight polyethylene.

9. The marine lantern of claim 1 wherein the closed continuous loop cable is a metal wire swaged together.

10. The marine lantern of claim 1 wherein the plurality of LEDs comprise LEDs that emit light having multiple distinct colors.

11. The marine lantern of claim 1 wherein the plurality of LEDs comprise LEDs that emit red, green, and white light.

12. The marine lantern of claim 1 further comprising a rotating dial connected to controller circuit, adapted to control brightness of white light and select different lighting modes.

13. The marine lantern of claim 1 further comprising a waterproof USB port connected to the electric battery.

* * * * *